April 15, 1958  G. O. SHERMAN, JR.  2,830,604
WASTE DISPOSING AND TABLEWARE RINSING APPARATUS
Filed May 3, 1956  2 Sheets-Sheet 1

INVENTOR.
GEORGE O. SHERMAN JR.
BY
George A. Evans
ATTORNEY

April 15, 1958  G. O. SHERMAN, JR  2,830,604
WASTE DISPOSING AND TABLEWARE RINSING APPARATUS
Filed May 3, 1956  2 Sheets-Sheet 2

INVENTOR.
GEORGE O. SHERMAN JR.
BY
*George A. Evans*
ATTORNEY

United States Patent Office 2,830,604
Patented Apr. 15, 1958

2,830,604

WASTE DISPOSING AND TABLEWARE RINSING APPARATUS

George O. Sherman, Jr., Johnson County, Kans., assignor to The Salvajor Company, Kansas City, Mo., a corporation of Missouri Application May 3, 1956, Serial No. 582,412

12 Claims. (Cl. 134—104)

This invention relates to novel apparatus that may serve the dual function, on one hand, of rinsing tableware and disposing of table scraps which are rinsed from the tableware, and on the other hand, when not rinsing, of being being used as a standard grinding device for grinding preparatory food waste or other disposable material.

The invention is an improvement on the Hilliker Patents 2,400,879 and 2,485,968, and on the Strehlow et al. Patent 2,593,359 and the Strehlow Patent 2,676,759.

None of these cited patents provide a grinding mechanism which can be easily operated to dispose of waste material while the dish rinsing and other portions of the apparatus are inoperable. Consequently, the machine of this invention eliminates the necessity of a separate grinder and reduces the investment of the hotel or restaurant owner.

The invention has as its object to provide a simple structure so that when the salvage basin of the prior art patents is removed, the waste material which the operator wants to grind can be dumped into the machine and will be automatically disposed of without in any way impairing the ability of the machine to operate in its desired manner when the basin is restored to facilitate salvaging of silverware.

Another object of the invention is to provide simple means for supporting the grinder and the tub which serves as the water reservoir so that parts are easily assembled and disassembled, thereby making the apparatus economical to manufacture and maintain.

A further object is to provide an arrangement of parts such that the apparatus may be thoroughly cleaned when not in service.

To accomplish the above objects, the invention provides a ring-shaped member from which the supporting legs depend. The reservoir or tub sits on this ring and its bottom is centrally apertured and mounted thereunder is a grinding device which may take any one of a number of forms. A cylindrical stack extends upwards from said aperture beneath the outlet of a cone or funnel-shaped member which is removably supported in the tub. The cone is apertured to accommodate a separating device of the type described in the aforesaid Strehlow Patent 2,676,759. When the apparatus is used as a pre-rinser of dishes and tableware, the primary function of the cone-shaped member is to direct the auxiliary supply of cold water directly into the conduit leading to the grinder while supporting the walls which confine the separator. When the salvage basin that rests on the top of the tub is removed, concentrated amounts of preparatory food waste, such as vegetable stalks and waste other than that left on the plates, can be dumped into the cone and will pass directly into the grinder to be disintegrated in a minimum of time.

Further objects of the invention and details of a machine containing a preferred embodiment thereof are set forth in the following description and in the accompanying drawings wherein.

Figure 1:
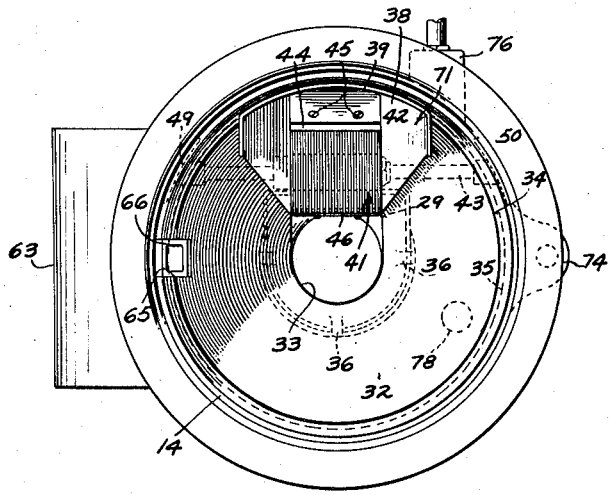
Fig. 1 is a plan view of a machine for disposing of waste and rinsing tableware with the salvage basin removed.
Figure 2:
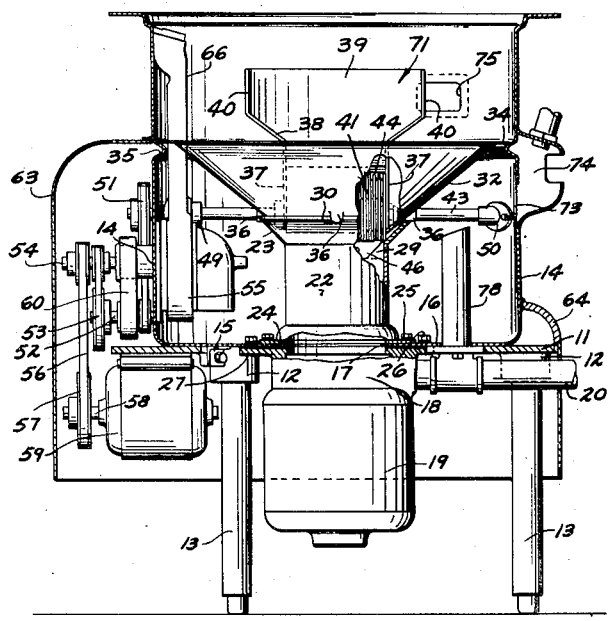
Fig. 2 is a side elevation, taken in section of the machine shown in Fig. 1, the section being taken approximately through the center of the machine.

Referring to the drawings, the ring-shaped member 11 serves as a support for the various elements of the machine and is provided on the underside with at least three sockets 12 from which the adjustable legs 13 depend. The legs 13 are long enough to provide the necessary clearance for the other portions of the machine which depend from the member 11.

Resting on the ring-shaped member 11 is the tub 14 of a height making the overall height of the machine comparable to that of a table. The tub has secured to its lower side a series of annularly arranged clips 15 which are bolted or otherwise secured to the ring 11. The bottom 16 of the tub has a central aperture 17 and disposed directly beneath this aperture is the vertical axis-type grinder 18 in which a fly wheel (not shown) is mounted on the vertical drive shaft of an electric motor disposed within a housing 19 below the grinder. The motor and grinder are suspended from the bottom of the tub 14 and the grinder is provided with a lateral discharge outlet communicating with a pipe 20 through which the ground material passes to the drain.

Surrounding the grinder opening and upstanding from the bottom of the tub 14 is a substantially vertical stack or conduit 22 which has an outwardly flared upper portion 23. This conduit, which may conveniently be made of an aluminum casting or other light-weight material, has an outwardly turned flange 24 at its lower end through which bolts 25 or other means may extend to hold the conduit firmly in place. Gaskets, of course, may be employed to seal the connection between the conduit and the bottom of the tub. These same bolts 25 could be used to support the grinder, but since it may be desirable to remove the grinder separately from the stack, I prefer to employ the separate bolts 26 which extend through the bottom of the tube and the motor flange 27 to mount the grinder.

The upper end of the conduit 22 is not annular but is of somewhat horseshoe shape (as indicated by dotted lines in Fig. 1) so that one edge 29 may be straight to facilitate its cooperation with the separator hereinafter described. The other portion of the top of the conduit are provided with spaced notches 30, which are used for locating purposes.

A frustro-conical or funnel-shaped member 32 is arranged to fit within the tub 14, and has a central outlet opening 33 located well inside the confines of the top of the flared portion 23 of the conduit 22. The top of the funnel has a flange 34 which is just slightly smaller than the diameter of the tub 14. The flange 34 rests on an inwardly formed rib 35 arranged slightly above the middle of the tub 14, in the side walls thereof. Lugs 36 on the underside of the funnel 32 cooperate with the notches 30 on the conduit 22 to locate and prevent displacement of the funnel when in use.

Figure 3:
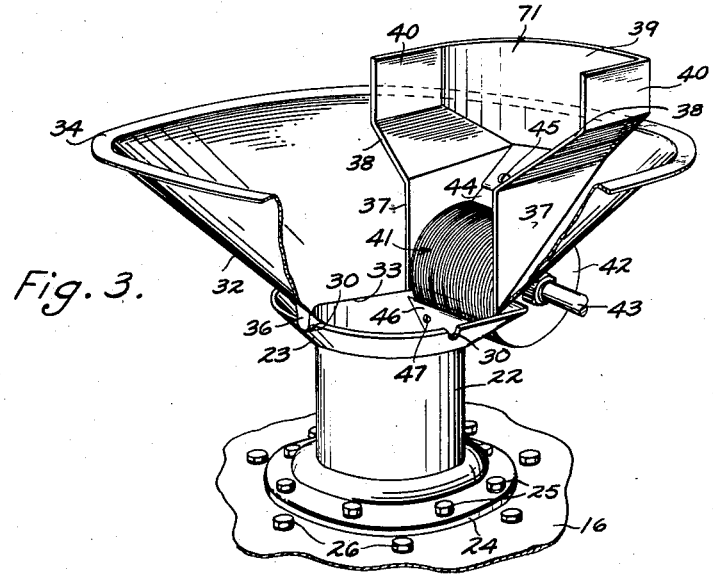
Fig. 3 is a perspective view of the feed conduit and funnel-shaped member which is arranged above the grinding device.
Figure 4:
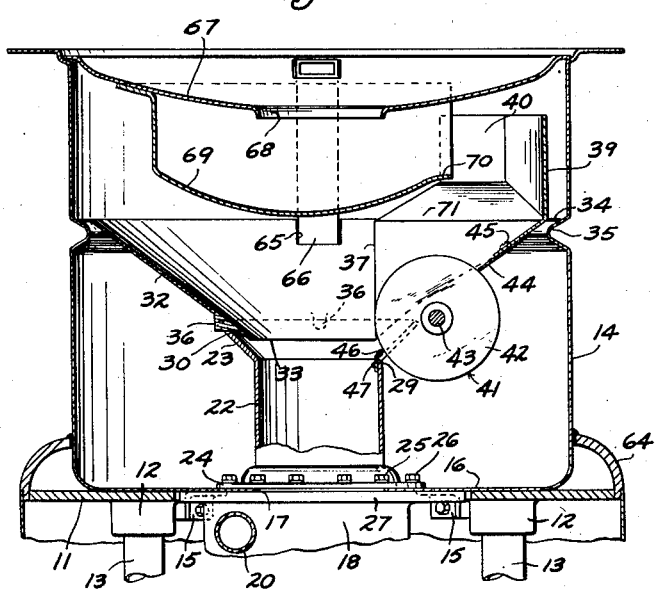
Fig. 4 is a side elevation of a tub in which the elements shown in Fig. 3 are contained.

The funnel is also provided with an aperture which is an extension of the outlet 33, i. e., the sides of the aperture are tangential to the outlet. On the two tangential sides of the aperture are upstanding wall members 37 having outwardly flaring upper portions 38 as best illustrated in Fig. 3. The wall members 37 cooperate with the back member 39 (see Fig. 4) and the flanges 40 to provide a separator box which completely encloses three sides of the aforesaid tangential aperture.

Arranged within this aperture and between the wall members 37 is the disc-type separator 41 consisting of annular spaced discs 42 rigidly mounted on a shaft 43. The function of the separator 41 is described in detail in the Strehlow Patent 2,676,759 and need not be repeated in this instance. It should be pointed out that in order to properly confine the separator, an adjustable plate 44 is fastened by the cap screws 45 to the underside of the portion of the funnel-shaped member in back of and above the separator. Likewise, the stripping plate 46 is adjustably located by the cap screws 47 mounted on the straight edge 29 of the conduit 22 where it may have a stripping action on the separator to remove stringy material therefrom.

The shaft 43 is supported on bearings 49 and 50 on the opposite sides of the tub 14. The shaft extends through the bearing 49 and is driven at slow speed by V-belt 51 connected to a counter shaft 52 arranged outside of the tub. The counter shaft 52, in turn, is driven by the V-belt 53 from the shaft 54 on which is mounted a recirculating pump 55 located inside the tub near the bottom thereof. The pump shaft 54, in turn, is driven by the belt 56 and the belt sheave 57 which is mounted on the motor shaft 58. The base of the motor 59 is hinged on the underside of an extension of ring 11 to provide adjustment of the tension on the belt 56. The bearing 60 supporting the counter shaft 52 is hinged about the axis of the shaft 54 to maintain tension on the belts 51 and 53. The motor and drive transmission parts are contained within the housing 63 and the sockets 12 and the other portion of the ring 11 on opposite sides of the machine are contained within the skirt plate 64 which adds to the attractiveness of the machine's appearance.

The function of the pump 55 is well described in the Hilliker patents heretofore mentioned. It should be pointed out that the funnel 32 is notched at 65 to accommodate the gusher tube 66 which extends upwardly from the pump outlet and provides the flow of recirculating rinsing water over the salvaging basin 67 which rests on the top of the tub 14. This basin 67 has a central scrapping hole 68 and the salvage portion 69 is mounted on the underside of the opening 68 where it serves as a catch basin for silverware and directs water over its discharge lip 70 into the separator box 71. Since the salvage basin 67 rests on a ledge formed at the top of the tub, it can be readily removed for purposes hereafter described.

For supplying water to the machine, there is an opening 73 in one of the walls of the tub slightly below the rib 35. A mixture of warm and cold water is supplied to a cup 74 arranged outside the tub and communicating with this opening 73. This water is circulated from the gusher tube as a wide stream over the salvage basin and is used to rinse the dishes which are passed through the stream as the water is desending.

Another opening 75 is provided in the wall above the rib 35 and this wall communicates with a second cup 76 outside the tub for supplying cold water to the grinder to aid in the disintegration of material passing through the grinder. The entrance of water through the opening 75 is preferably tangential to the funnel so that the water will flow around the funnel-shaped member to the conduit 22; thus it may serve the additional function of keeping the funnel-shaped member in a clean condition.

The provision of the funnel-shaped member enables the operator to discontinue the running of the motor 59, and upon removal of the salvage basin 69, food waste material other than that which was on the plates, such as that resulting from the preparation of the meal, may be discharged onto the funnel-shaped member. The funnel-shaped member will support this material as it slides down into the conduit 22 and, hence, to the grinder 18. The source of cold water supply which flows over the upper face of the funnel may be interconnected with the grinder motor in a well-known manner to insure that water is being supplied in sufficient volume or at adequate pressure whenever the grinder is operating.

The space below the funnel-shaped member 32 serves as a reservoir for the warm recirculating rinsing water. The upstanding drain pipe 78 is operable only if the discharge through the grinder should, for some reason, be plugged. This results from the fact that the top of the pipe 78 is above the edge 29 between the conduit 22 and the separator. Hence, because of the constant addition of fresh water, to the reservoir, there will be a flow of waste rinsing water over the top of the plate 46 into the conduit 22, which tends to keep clean the discs of the separator 41. Such food particles, as do pass inadvertently through the separator and collect in the reservoir, can be cleaned out conveniently by the removal of the funnel-shaped member 32 and the removal of the stack 78 so that the reservoir can be drained and scrubbed.

The invention having been described what is claimed is:

1. In apparatus for rinsing tableware and disposing of table scraps, an open top tub having a bottom; an uppermost basin covering said open top of the tub and provided with a scrap hole; a funnel-shaped member in the tub between the basin and said bottom, subdividing the tub into a reservoir below the member adapted to contain a supply of rinse water, and a chamber above the member; means for pumping water from the reservoir and discharging the same into said basin; a catch basin in said chamber beneath said hole having an outlet disposed to discharge rinse water and scraps into said member; and means for receiving scraps from said member, said basins being entirely and readily removable from the tub, exposing the member for receiving scraps directly.

2. Apparatus as set forth in claim 1 wherein said member is readily removable from within the tub.

3. In apparatus for rinsing tableware and disposing of table scraps, an open top tub having a perforated bottom; a tubular stack in the tub registering with the perforation of said bottom; an uppermost basin covering said open top of the tub and provided with a scrap hole; a funnel-shaped member in the tub between the basin and said bottom, discharging into said stack and subdividing the tub into a reservoir below the member adapted to contain a supply of rinse water, and a chamber above the member; means for pumping water from the reservoir and discharging the same into said basin; and a catch basin in said chamber beneath said hole having an outlet disposed to discharge rinse water and scraps into said member, said basins being entirely and readily removable from the tub, exposing the member for receiving scraps directly.

4. In apparatus for rinsing tableware and disposing of table scraps, an open top tub having a perforated bottom; a tubular stack in the tub registering with the perforation of said bottom; an uppermost basin covering said open top of the tub and provided with a scrap hole, a funnel-shaped member in the tub between the basin and said bottom, discharging into said stack and subdividing the tub into a reservoir below the member adapted to contain a supply of rinse water, and a chamber above the member; means for pumping water from the reservoir and discharging the same into said basin; a catch basin in said chamber beneath said hole having an outlet disposed to discharge rinse water and scraps into said member, said basins being entirely and readily removable from the tub, exposing the member for receiving scraps directly; a grinder registering with said perforation beneath said bottom for receiving scraps from the stack; and means for directing an auxiliary supply of water onto said member to assist in grinding operations.

5. In apparatus as set forth in claim 3 wherein said stack has a hopper at its uppermost end receiving the lowermost end of said member but spaced from the latter for overflow of water from the receiver into the stack.

6. In apparatus for rinsing tableware and disposing of table scraps, an open top tub; an uppermost basin covering said open top of the tub and provided with a scrap hole; a funnel-shaped member in the tub sub-dividing the latter into a reservoir below the member adapted to contain a supply of rinse water, and a chamber above the member; structure carried by the tub therewithin for separating scraps from the rinse water, said member having an opening placing the receiver into communication with the chamber and receiving said structure; means for pumping water from the reservoir and discharging the same into said basin; a catch basin in said chamber beneath said hole having an outlet disposed to discharge rinse water and scraps to said separator; and means for receiving the scraps from said separator, said basins being entirely removable from the tub, exposing the member for receiving scraps directly.

7. In apparatus for rinsing tableware and disposing of table scraps, an open top tub provided with a perforated bottom; a tubular stack in the tub registering with the perforation of said bottom; an uppermost basin covering said open top of the tub and provided with a scrap hole; a funnel-shaped member in the tub discharging into said stack and subdividing the tub into a reservoir below the member adapted to contain a supply of rinse water, and a chamber above the member; structure carried by the tub therewithin for separating scraps from the rinse water, said member having an opening placing the receiver into communication with the chamber and receiving said structure; means for pumping water from the reservoir and discharging the same into said basin; and a catch basin in said chamber beneath said hole having an outlet disposed to discharge rinse water and scraps to said separator, said basins being entirely removable from the tub, exposing the member for receiving scraps directly.

8. Apparatus as set forth in claim 7 wherein said member is readily removable from within the tub and wherein is provided means interlocking the stack and the member for preventing rotation of the latter relative to the tub and said structure.

9. In apparatus for rinsing tableware and disposing of table scraps, an open top tub provided with a perforated bottom; a tubular stack in the tub registering with the perforation of said bottom; an uppermost basin covering said open top of the tub and provided with a scrap hole; a funnel-shaped member in the tub discharging into said stack and subdividing the tub into a reservoir below the member adapted to contain a supply of rinse water, and a chamber above the member; structure carried by the tub therewithin for separating scraps from the rinse water, said member having an opening placing the receiver into communication with the chamber and receiving said structure; means for pumping water from the reservoir and discharging the same into said basin; a catch basin in said chamber beneath said hole having an outlet disposed to discharge rinse water and scraps to said separator, said basins being entirely removable from the tub, exposing the member for receiving scraps directly; a grinder registering with said perforation beneath said bottom for receiving scraps from the stack; and means for directing an auxiliary supply of water onto said member to assist in grinding operations.

10. In apparatus as set forth in claim 9 wherein said member has sides partially embracing said structure for preventing the auxiliary supply of water from flowing to the reservoir through said opening.

11. In apparatus for rinsing tableware and disposing of table scraps, an open top tub provided with a perforated bottom; a tubular stack in the tub registering with the perforation of said bottom; an uppermost basin covering said open top of the tub and provided with a scrap hole; a funnel-shaped member in the tub discharging into said stack and subdividing the tub into a reservoir below the member adapted to contain a supply of rinse water, and a chamber above the member; a separator box in said member below the basin; structure carried by the tub therewithin for separating scraps from the rinse water, said member having an opening placing the receiver into communication with the box and receiving said structure; means for pumping water from the reservoir and discharging the same into said basin; and a catch basin in said chamber beneath said hole having an outlet disposed to discharge rinse water and scraps into said box, said basins being entirely removable from the tub, exposing the member for receiving scraps directly.

12. Apparatus as set forth in claim 11, said box having an open top and opening inwardly at the front thereof within a vertical plane outwardly spaced radially from the vertical axes of the stack and the member.

References Cited in the file of this patent
UNITED STATES PATENTS

| | | |
|---|---|---|
| 2,400,879 | Hilliker | May 28, 1946 |
| 2,485,968 | Hilliker | Oct. 25, 1949 |
| 2,593,359 | Strehlow | Apr. 15, 1952 |
| 2,676,759 | Strehlow | Apr. 27, 1954 |
| 2,732,191 | Viall | Mar. 6, 1956 |